United States Patent [19]

Couture

[11] 4,265,586

[45] May 5, 1981

[54] LIFT ASSEMBLY

[76] Inventor: Jacques Couture, Rte. 277, St. Claire, County of Bellechasse, Province of Quebec, Canada, G0R 2V0

[21] Appl. No.: 948,800

[22] Filed: Oct. 5, 1978

[51] Int. Cl.[3] .................................................. B60P 1/00

[52] U.S. Cl. ...................................... 414/545; 414/917; 414/921

[58] Field of Search ................ 414/545, 917, 921, 546

[56] References Cited

U.S. PATENT DOCUMENTS

| | | | |
|---|---|---|---|
| 2,527,818 | 10/1950 | Ives | 414/917 |
| 3,637,097 | 1/1972 | Horowitz | 414/917 |
| 3,968,890 | 7/1976 | Robson | 414/917 |
| 3,984,014 | 10/1976 | Pohl | 414/921 |

FOREIGN PATENT DOCUMENTS 520941 1/1956 Canada .

*Primary Examiner*—Lawrence J. Oresky

[57] ABSTRACT

A lift assembly for use on a vehicle, more particularly to lift wheelchairs into vehicles, is disclosed. The lift assembly comprises a pair of vertically spaced support posts adapted to be mounted on the vehicle just inwardly of a side or rear doorway, a platform adapted to be moved from ground to an intermediate position outside the vehicle is substantially level with the floor of the vehicle, and linkages interconnecting the platform to the posts, each linkage comprises two parallel rigid arms pivotally connected to and slidably mounted at one end along a respective post, two other parallel rigid arms pivotally connected to the first mentioned parallel arms at one end and to the platform at the other end. The first mentioned parallel arms on the platform form parallelograms with the other parallel arms and a respective post so that the linkages and platform may be folded to a stored position inside the vehicle. Means are provided for maintaining the platform level with the ground during movement of the platform from ground to such intermediate position. Means are also provided for moving the platform from ground to such intermediate position.

2 Claims, 6 Drawing Figures

LIFT ASSEMBLY

This invention relates to a lift assembly for vehicles, and more particularly, to a lift assembly permitting to lift wheelchairs into vehicles.

BACKGROUND OF THE INVENTION

Invalid people confined to wheelchairs usually like to be as independent as possible and some of them are reluctant to travel because they do not appreciate having to rely on other persons to transfer them from their wheelchair to the vehicle. Lift devices for lifting wheelchairs into vehicles have been previously provided. However, the mechanisms of such lift devices have been rather complicated and expensive. Some of them also occupy a lot of space in the interior of the vehicle such that the loading capacity of the vehicle is greatly reduced.

SUMMARY OF THE INVENTION

It is therefore the object of the present invention to provide a lift assembly which is of simple construction and which is compact when stored so that it occupies a minimum amount of space in the vehicle.

The lift assembly, in accordance with the invention, comprises a pair of vertically spaced support posts adapted to be mounted on the vehicle just inwardly of a side or rear doorway, a platform adapted to be moved from ground to an intermediate position outside the vehicle which is substantially level with the floor of the vehicle, and a pair of linkages interconnecting the platform and the posts. Each linkage comprises two parallel, rigid supporting arms pivotally connected to and slidably mounted at one end along a respective post, inner and outer upright parallel rigid arms pivotally connected to the first mentioned parallel arms at one end and pivotally connected to the platform at the other end. The parallel supporting arms and the platform form parallelograms with the inner and outer parallel arms and a respective post so that the linkages and platforms may be folded to a stored position inside the vehicle. Means are provided for maintaining the platform level with the ground during movement of the platform from ground to the intermediate position. Means are also provided for moving the platform from ground to the intermediate position.

The means for moving the platform between ground and the intermediate position comprises a shaft journalled across the upper end of the posts, a pair of cables each attached at one end to the pivotal connection of a supporting arm with the inner upright arm of a respective linkage and at its other end to the shaft, and means for rotating the shaft to cause the pair of linkages to slide on the posts and thus raise the platform attached to the linkages. Rotation of the shaft may be done by a rotatable handle mounted on one of the linkages to which is attached a pulley. A cable is wound a few turns around this pulley and also wound a few turns around a second pulley which is coupled to the above mentioned shaft. Rotation of the handle thus automatically rotates the shaft to lift the platform. A motor could also be coupled to the shaft through suitable gear means for raising the platform. The arrangement is such that the linkages and platform can be folded in stored position within the vehicle doorway directly from the intermediate position of the platform.

SHORT DESCRIPTION OF THE DRAWINGS

The invention will now be disclosed, by way of example, with reference to the accompanying drawings in which.

Figure 1:
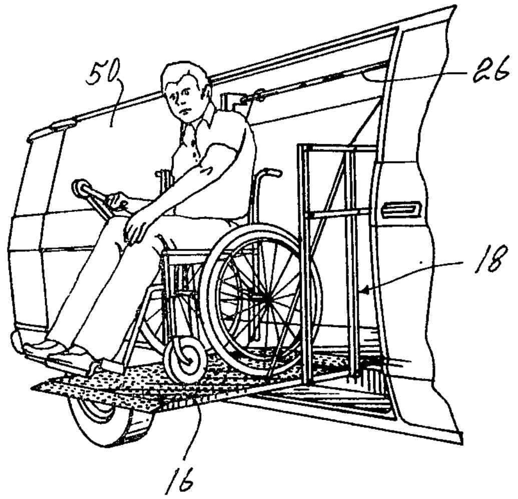
FIG. 1 illustrates a perspective view of a vehicle having a lift assembly in accordance with the invention located in the ground position.

Referring to the drawings, there is shown a lift assembly comprising a pair of vertically spaced support posts 10 secured by bolts 12 to the floor of the vehicle and to the wall of the vehicle by means of brackets 14. Although only one post is shown in the drawings, it will be understood that there is one post on each side of the doorway. The lift assembly further comprises a platform 16 and a pair of linkages 18 interconnecting the platform 16 to the posts 10. Each lift linkage 18 comprises two parallel support arms 20 and 20' pivotally connected to and slidably mounted at their inner end to a respective post 10, and two parallel upright, inner and outer arms 22 and 22', respectively, pivotally connected at their upper end portions to arms 20 and 20' and at their lower end to the inner portion of platform 16.

Figure 2:
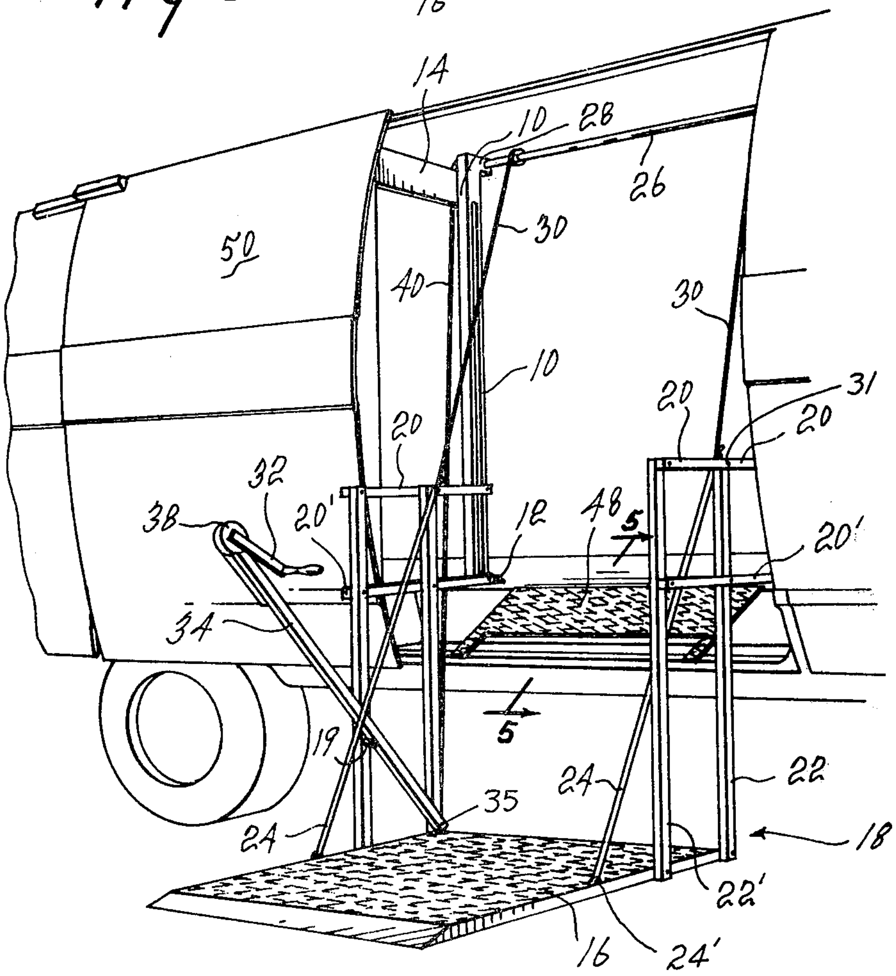
FIG. 2 illustrates the lift assembly in the position wherein the platform is level with the floor of the vehicle.
Figure 3:
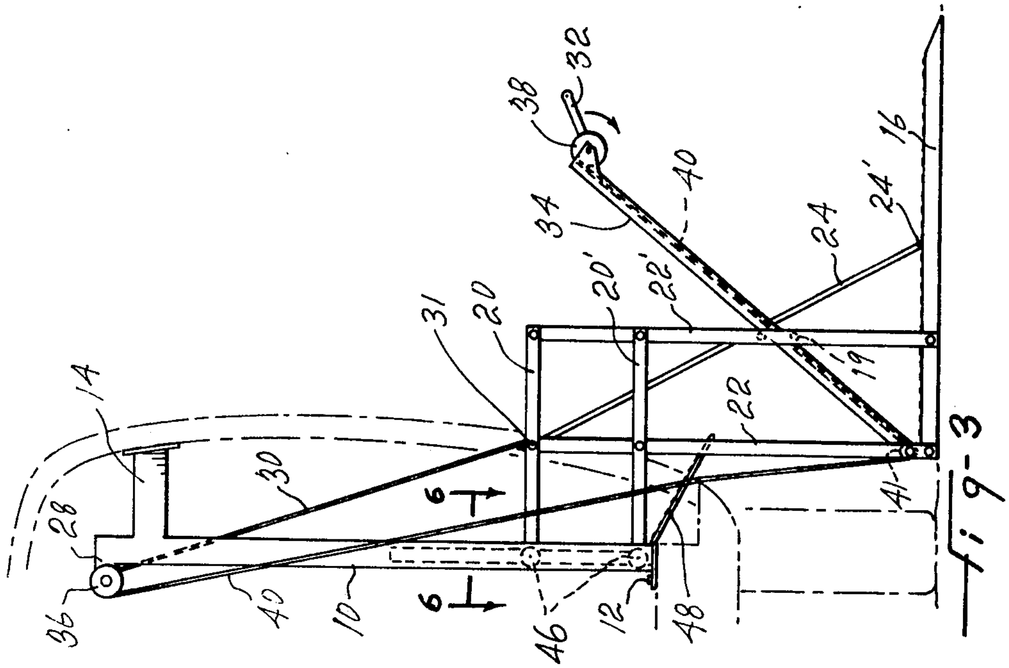
FIG. 3 illustrates a side elevation view of the lift assembly in accordance with the invention.

The platform is moved from ground to an intermediate position which is substantially level with the floor of the vehicle as shown in FIGS. 1, 2 and 3. The platform is maintained in a plane substantially parallel to the floor of the vehicle in its movement between ground and such intermediate position by means of a flexible non-extensible cable 24 attached to the pivotal connection 31 of top arm 20 with inner upright arm 22 and to platform 16 at a point 24' spaced outwardly from the pivotal connection of outer upright arm 22' to platform 16, so as to permit safe raising and unloading of a wheelchair or other type of loads in the vehicle.

Figure 5:
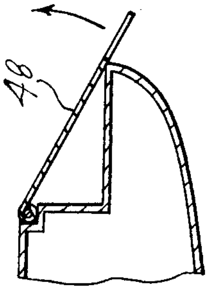
FIG. 5 illustrates an enlarged view taken along lines 5—5 of FIG. 3.

A shaft 26 is journalled on extensions 28 secured to the top of the posts 10 and a pair of cables 30 is attached one at each end to the shaft and is wound on said shaft while the other end of each cable 30 is attached to the pivotal connection 31 of the respective linkage. Rotation of the shaft 26 winds the cables 30 around the shaft and thus raises the platform. Rotation of shaft 26 is shown in the drawings as being done manually by a handle 32 mounted on a hallow arm 34 pivotally connected at its lower end 35 to the lower end of inner arm 22. Arm 34 is releasably retained in upwardly outwardly inclined position by a stop 19 fixed to outer arm 22'. As shown more clearly in FIGS. 3 and 5, a first pulley 36 is secured to shaft 26 and a second pulley 38 to handle 32 and a cable 40 is wound a few times around the pulleys 36 and 38. Arm 34 is hollow and cable 40 extends through it and is trained on an idle pulley 41 at the inner end of arm 34. Thus, rotation of the handle 32 permits easy raising of the platform. By adjusting the diameter of the pulley 36 with respect to shaft 26, a suitable gear reduction may be obtained. Indexing means (not shown) may be used for preventing backward rotation of the handle during movement of the platform or when the platform has reached its intermediate position level with the vehicle floor. Although a manual handle is shown, it is to be understood that the lift assembly could be operated by a motor coupled to shaft 26 through suitable reduction gears.

Figure 6:
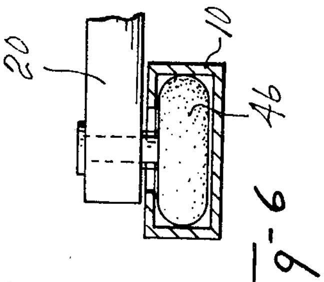
FIG. 6 illustrates an enlarged view taken along lines 6—6 of FIG. 3.

In order to permit easy sliding of the arms 20 along posts 10, the posts 10 are preferably hollow as shown in FIG. 6 and provided with a slot 42 of suitable length through which enters a shaft 44 carrying a roller 46 bearing against the inside of the posts.

A short ramp 48 is pivotally connected to the vehicle floor at its inner edges and has outwardly projecting tabs 49 to be engaged by the raising platform 16 so that ramp 48 bridges the vehicle floor to the platform to permit easy rolling of the wheelchair into the vehicle.

Figure 4:
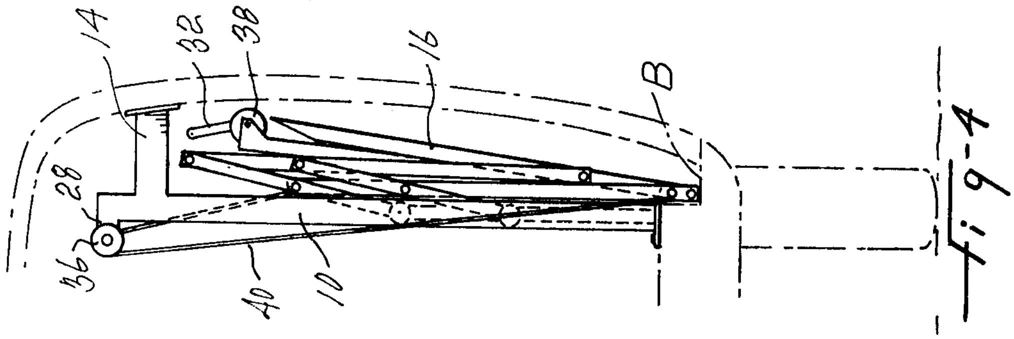
FIG. 4 illustrates the lift assembly in accordance with the invention as it is being folded to a compact position inside the vehicle.

Once the invalid has wheeled himself inside the vehicle, or has been wheeled by another person, the lift assembly may be easily folded to a compact stored position inside the vehicle due to the parallelograms formed by arms 20 and the platform with arms 22 and the posts 10. FIG. 4 of the drawings shows the system in partially folded position. When fully folded, platform 16 is vertical and vehicle door 50 can be closed.

Although the invention has been disclosed with reference to a preferred embodiment, it is to be understood that it is not limited to such embodiment but by the scope of the claims only. For example, the lift assembly may be driven manually or electrically and the driving mechanism for raising and lowering the platform may take other forms.

What I claim is:

1. A lift assembly for use on a vehicle comprising:

(a) a pair of vertically-spaced support posts adapted to be mounted within the vehicle just inwardly of a side or rear doorway;

(b) a platform pivotable between an operative substantially horizontal position and an inoperative upright stored position, said platform, while in said operative position, adapted to be moved from ground to an intermediate position outside the vehicle which is substantially level with the floor of the vehicle, said platform having an inner end portion closer to said vehicle and an outer end portion extending away from said vehicle when in said operative position;

(c) a pair of linkages interconnecting said platform and said posts, each linkage comprising two rigid, parallel supporting arms pivotally connected to and slidably mounted at their inner end along a respective post, an inner and an outer upright rigid arm, parallel to each other, and pivotally connected at their top end to said parallel, supporting arms at points spaced outwardly from the inner ends of said supporting arms, and at their lower end to the inner end portion of said platform, said parallel supporting arms and said platform forming parallelograms with upright parallel arms and with said respective posts, so that the linkages and platform may be folded to a stored position inside the vehicle;

(d) inextensible, flexible tie means connected to the pivotal connection of one of said supporting arms with said inner upright arm, and to the outer portion of said platform for maintaining the platform level with the ground during movement of the platform from ground to said intermediate position, while allowing folding of said linkages and platform to said stored position;

(e) means for moving said platform from ground to said intermediate position, including a shaft journalled across the upper end of said posts, a pair of cables each attached at one end to said shaft and at its other end to said pivotal connection of a respective linkage, and means for rotating said shaft to cause said pair of linkages to slide on said posts and thus raise or lower the platform attached to the linkages and to allow the inner ends of said supporting arms to slide down along said posts during folding movement of said linkages and platform; and (f) control means having actuation means mounted thereon for causing vertical adjustment of said platform, said control means comprising an arm pivotally mounted to the lower end of said inner upright arm of one of said linkages, a stop carried by said outer upright arm of said one linkage for releasably retaining said control means in an upwardly and outwardly inclined operative position and thus allowing folding of said control means during folding movement of said linkages and platform.

2. A lift assembly as defined in claim 1, wherein said arm is a hollow arm, said actuation means is a rotatable handle mounted on the upper end of said arm, a pulley secured to said handle, a second pulley secured to said shaft and an additional cable wound a few turns around said pulleys and adapted to rotate said shaft upon operation of said handle, said additional cable passing through said hollow arm.

* * * * *